Patented Mar. 24, 1936

2,034,797

UNITED STATES PATENT OFFICE 2,034,797

TREATMENT OF WHITING AND THE LIKE

John W. Church and Raymond R. McClure, Painesville, Ohio, assignors to Pure Calcium Products Company, Painesville, Ohio, a corporation of Ohio No Drawing. Application August 22, 1933, Serial No. 686,240. In Canada November 21, 1931

21 Claims. (Cl. 134—58)

The present invention relates to the treatment of whiting and the like to improve its properties for use as a filler for plastics such as paints, enamels, rubber compositions, putty, etc.

This application is a continuation in part of our copending applications Serial No. 640,527, filed October 31, 1932, Serial No. 625,530, filed July 28, 1932, and Serial No. 578,614, filed December 2, 1931. Serial No. 640,527 was a continuation in part of our applications Serial Nos. 578,614 and 625,530. Serial No. 578,614 was a continuation in part of our application Serial No. 481,908, filed September 15, 1930. Serial No. 625,530 was a continuation in part of our application Serial No. 492,354, filed October 30, 1930.

The object of our invention is to produce from relatively inexpensive substances, such as whiting or the like, materials which will fill, to a large extent, the position now held by other more expensive materials in the paint, rubber and plastic industries.

The requirements for pigments in general (including fillers) are twofold in these industries; (1) their coloring or covering effect, and (2) their effect on the life and strength of the compositions in which they are used.

We are concerned primarily with the latter function. As an instance of this second function, we may say that, for instance, carbon black is used in rubber as a "reinforcing pigment". Its black color is really of little value, but the physical properties, such as the increased resistance to wear and tear which it imparts to such rubber goods as tire tread stocks, are vital. White lead (basic lead carbonate) is used in exterior house paint not entirely because it is a white covering pigment (because it has relatively low hiding power), but because it imparts to the paint film the characteristic of resisting the elements better than other pigments. As an instance, pure titanium dioxide has much higher hiding power than white lead, but it cannot be used effectively alone in exterior paints because it induces early and severe chalking.

Carbon black is vital to the rubber industry because it is capable of forming a true bond with the rubber matrix. This bondability is believed to be due to the intimate presence on each particle of carbon black of a sufficient amount of organic material which is capable of forming a strong bond between the carbon black particle and the rubber.

White lead bonds with the linseed oil vehicle commonly used in exterior paints by means of its reaction with the acidic substances in the oil, so that a film of lead soap is formed on the exterior of the white lead particle. The soap having its interior bond in the white lead itself and its exterior bond being organic and capable of bonding strongly with the oil matrix, forms a very cohesive paint film which endures for long periods of time against the elements. Zinc oxide forms a similar bond with vehicles due to soap formation. Zinc soaps, however, are extremely hard and brittle and allow little or no elasticity in the paint film, so that zinc oxide alone is not fully desirable for use in exterior house paints inasmuch as it will induce cracking, which is the opposite of chalking. Zinc oxide, however, is often used in exterior paints in combination with non-wetting or non-bonding pigments and fillers which are prone to chalk, as a counterbalance against chalking. Zinc oxide is also reinforcing in rubber probably because it forms soaps with the rubber acids.

The so-called fillers, such as whiting, barytes, magnesium silicate, etc., are notoriously poor bonding materials and they are used to a very limited extent in exterior and interior paints of good quality. Likewise, they make poor bonds with rubber and cannot be used in large quantity except in rubber goods of comparatively inferior quality. This lack of bondability may be explained by the lack of any bonding agent on the surface of such particles and their non-reacting to form such bonds with the acids present in the matrix.

If fillers could be obtained which were truly bondable with matrices such as oil and varnish, and rubber, their use would be much extended and it would be possible in a great many cases to replace some of the above-mentioned expensive pigments with such relatively inexpensive materials.

We have discovered a process whereby such inexpensive materials as whiting and the like may be given bonding properties comparable with the bonding properties of such pigments as white lead, zinc oxide, and carbon black, whereby such inexpensive materials when so treated may be substituted for the more expensive materials with satisfactory results.

In accordance with our process, whiting or similar material is subjected to a very prolonged and severe attrition, preferably in a ball mill, together with a small amount of a material, such as stearic acid or rosin, which will serve the dual function of an anti-compactant and an interbonding agent. These materials serve as anti-compactants to permit the grinding to be prolonged far beyond that possible without the anti-compactant action of such substances. They also serve as interbonding agents in causing a firm bond between the whiting particles and the matrix, such as rubber or paint oils, probably by forming thin surface films on the whiting particles.

A charge of dry powdered whiting, preferably precipitated whiting, is put into the ball mill, together with a small quantity, say, about 1 to 3%, of the anti-compactant and interbonding agent, such, for example, as rosin, which is principally abietic acid. The mill is then started and the first action is a general dissemination of the rosin throughout the body of the whiting. After a short time the material becomes decidedly free flowing, that is to say, it has many of the characteristics of a liquid in that it cannot be held on a knife blade, it seeks its own level and will flow through very small openings. When the material is in such free flowing stage it can be acted upon very effectively by the grinding balls since it will not cake upon the balls, and will allow the balls to come in contact with each other to exert a very severe shearing and attrition action upon the particles of the whiting caught between them. The grinding is continued until the end of the free flowing stage is approached or reached, whereupon the whiting is discharged from the mill.

The action is believed to be as follows: The grinding balls exert a severe attrition upon the surfaces of the whiting particles and this serves to displace the adsorbed gas films from the particles and replace them with very thin films of calcium resinate. When the rosin is pounded into intimate contact with the surfaces of the particles, it combines chemically with the calcium carbonate to form a very thin film of calcium resinate. The aggregate surface areas of the minute particles is enormous and it requires a very prolonged and severe attrition or grinding to thoroughly spread the rosin over and pound it into intimate contact with the surfaces of all of the whiting particles.

After the initial grinding and after the rosin becomes thoroughly disseminated through the whiting, an evolution of gas from the whiting is noted. The gas comes from the adsorbed gas films which are being displaced by the rosin, and also, to some extent, from the gas evolved by the chemical combination of the rosin with the calcium carbonate. The anticompactant action of the rosin is believed to be due primarily to its action in producing such gas which remains entrapped as free gas in the mass of the whiting, serving as gaseous cushions between the whiting particles and maintaining the mass in a non-compacted free flowing condition. As the grinding continues, more gas is evolved, until apparently all of the displaceable adsorbed gas films have been removed and replaced by the films of calcium resinate. If the grinding is continued long enough, the material finally passes from the free flowing state into a compacted state in which it cakes against the sides of the mill and between the balls, and prevents further effective grinding. Also, after the material has been compacted it ceases to be of value as a filler since it becomes non-dispersable in plastic matrices. When the material passes from the free flowing state to the compacted state there is a drop in the power required to drive the mill, showing that less work is then being done upon the whiting.

If the whiting were put into the ball mill and ground without the use of some agent, such as rosin or stearic acid, the whiting would remain in a loose grindable condition for but a relatively short time, and would then become caked and compacted. Whiting thus ground does not have the desirable properties imparted to whiting which is subjected to the very prolonged grinding with an anti-compactant interbonding agent in accordance with our process. The action of the rosin or stearic acid is to prolong the loose or free flowing condition of the whiting for a period several times what it would have been if the rosin or stearic acid were not employed. The dual functions of the rosin or the stearic acid as an anti-compactant and as an interbonding agent, are probably manifestations or functions of a single phenomenon. They probably serve as anti-compactants because of their ability to become spread into tightly adherent and probably chemically combined very thin films on the surfaces of the particles, thereby displacing the adsorbed gas films and releasing such gas which in turn is entrapped in the mass of the whiting and serves to maintain the whiting in a loose free flowing condition as the grinding is continued. They also serve as effective interbonding agents because during the prolonged grinding made possible by their anti-compactant action, they are thoroughly disseminated over and pounded into the large surface areas of the powdered material so as to form films having sufficiently intimate contact with the particles to displace substantially all of the adsorbed gas and having sufficient adhesion and strength to act as strong linkages or bonds between the particle and the matrix employed, such as the paint oil or the rubber.

Chemical analyses of the whiting ground with rosin shows that the rosin when ground according to our process is substantially all converted to calcium resinate, and similarly, when ground with stearic acid, the stearic acid is converted substantially all to calcium stearate. This indicates that the interbonding films are so thin as to be of molecular proportions, allowing substantially all of the rosin or stearic acid molecules to react with the calcium carbonate surfaces. There is evidence that in very thin films of this character the molecules tend to orient themselves so that a molecule of calcium resinate is oriented with its calcium end against the whiting particle and its resinate end outwardly, and similarly in the case of a calcium stearate particle. Such films are therefore believed to have a strong inorganic bond with the whiting particle itself, and to form a strong organic bond with the matrix employed, thus completing the linkage. Whatever may be the reason, the bond has a strength and character similar to the reactive bonding of the reactive pigments, such as white lead and zinc oxide, or reinforcing pigments such as carbon black.

In order to impart to the whiting or similar substance the properties hereinafter more particularly described, which permit its successful substitution for the more expensive pigments of the type indicated above, a combination of certain factors appears to be involved:

1. The whiting is subjected to a very severe attrition prolonged far beyond the grinding processes heretofore employed in treating whiting and far beyond the grinding to which it would be possible to subject the whiting if it were not for the anti-compactant action of the anti-compactant interbonding agent which we employ.

2. The agent which we employ serves as an effective anti-compactant so as to maintain the whiting in a free flowing condition for a considerable period of time, so that the grinding may be prolonged far beyond that possible without such anti-compactant action.

3. There is a rather narrow margin in the amount of the anti-compactant interbonding agent employed. It should be used in sufficient amount to serve as an interbonding agent in the finished material, as well as to maintain the material in the free flowing state long enough for the required grinding. The amount used, however, should not be enough to transform the whiting or the like into a viscous paste. The material should be in a loose free flowing condition in order to get effective grinding. Moreover, the amount employed should not leave a substantial excess over that which can be held combined with the whiting particle surfaces in the form of thin probably mono-molecular films. For example, if too much rosin or stearic acid is employed, there will be free rosin or stearic acid which may have a deleterious effect upon the paint or rubber composition. In using agents, such as rosin and stearic acid, we find that they should be used in amounts from about .1% to 5% depending upon the particle size and effect desired, preferably from about 1% to 3%.

4. The agent added should, in addition to serving as an anti-compactant during grinding, serve as an interbonding agent in the treated whiting so as to firmly bond the whiting particles with the bonding matrix employed in the plastic in question, such as a paint, rubber composition, putty, etc.

Our work with various fillers and interbonding agents indicates that they should be of the following character:

(a) The filler treated should be whiting or other alkaline earth metal carbonate, or a material containing such carbonate, since this class of materials apparently has some reaction with the interbonding agents employed, whereby the interbonding films have a linkage with the particles comparable with a molecularly attached bond. In the class of alkaline earth metals we include magnesium, as well as calcium, barium and strontium. Calcium carbonate is, however, preferred since this type of bond is more easily formed than with the other carbonates. Since materials containing such carbonates are susceptible to our process, as well as the pure carbonates, when we speak of alkaline earth metal carbonates in our claims, we intend to include not only the pure carbonates, but also materials containing such carbonates.

The various fillers and pigments appear to be classifiable in three general classes according to their reactivity with the usual organic matrices or bonding media. One class includes such reactive substances as basic lead carbonate and zinc oxide, which are sufficiently reactive to react with linseed oil in the paint and form a soap which serves as an interbonding agent. Similar action apparently occurs when zinc oxide is added to rubber by a reaction between the zinc oxide and the acidic substances of the rubber. In this class might be included carbon black, which in its formation acquires a film of organic substance which is, on the one hand, strongly bonded to the carbon particle, and on the other hand, strongly capable of bonding with a matrix such as rubber. Another class includes those filler materials, such, for example, as the sulphates and silicates, which are chemically so stable that they appear to be capable of substantially no reaction with the usual organic matrices and bonding media. A third and intermediate class appears to be the alkaline earth metal carbonates, which are not reactive enough so as to secure reactive bonding with paint oils or with rubber by ordinary processes of mixing. These carbonates, however, appear to have enough reactivity to form a reactive type of bond with the interbonding agents which we employ when such interbonding agents are brought into such very intimate contact with the carbonate particles by the prolonged and severe grinding of our process. Calcium carbonate appears to be best adapted to our process since its surface molecules are relatively unstable and apparently contain some of their calcium oxide in equilibrium with adsorbed carbon dioxide gas. We believe that there is some chemical action which takes place between the unstable carbonate surface and the interbonding agent, when the interbonding agent is intimately ground against the calcium carbonate surfaces in our process. Whatever may be the chemical reason, the alkaline earth metal carbonates appear to be a class of substances which are capable of the reactive type of bonding under these conditions, and this is particularly true of calcium carbonate; as distinguished, on the one hand, from substances in which reactive bonding can be accomplished without special precautions as in the case of basic lead carbonate and zinc oxide, and on the other hand, from those substances which as a class are not capable of reactive bonding, such as the sulphates and silicates.

(b) The interbonding agent should be a substance which forms, or is capable either in whole or in part of forming, a bond comparable to that of a molecular attachment with the surface of the material of the filler being ground. For example, rosin and stearic acid react with calcium carbonate to form calcium resinate or calcium stearate. An agent, such as linseed oil, which contains some acidic substances, is capable of reacting in part with the carbonate particles. Agents, such as calcium resinate or calcium stearate, may be used, since they are already in the form of an organic soap or salt and the molecules can concurrently form the desired inorganic bond with the whiting and the organic bond with the plastic matrix. Certain gums, such as ester gum, have a similar action, probably due to some acidic bodies contained in them. Certain of the higher alcohols also bond in the desired manner, possibly because of their semi-acidic nature.

We will next specifically describe certain commercial procedures in treating artificial whiting in accordance with our process.

The artificial whiting is first produced by precipitation by any of the well-known methods of producing precipitated whiting. The particle size can be controlled by the precipitating process, as is also well known. Precipitated whiting can be produced having very small particle sizes varying from ½ micron average diameter to 5 microns average diameter. The whiting can be precipitated free from foreign substances, such as silica or other materials which are abrasive and which would give ball wear and also discolor the whiting because of abrading metal from the mill and its grinding elements during the prolonged grinding in our process. For producing a high grade material, particularly for use in paints, it is important that the material be free from such discoloration.

In making a material which we have furnished to the paint industry, precipitated whiting of average particle size of about 5 microns and of a whiteness equal to that of pure magnesium carbonate is ground in a ball mill with about 1% "water white" rosin. The particular mill which we have employed is a ball mill 5 feet in diameter by 10 feet long which contains about 45% by volume of ½ inch diameter hardened steel balls. The mill is equipped with lifter bars which are in the form of ribs extending about ¼ inch in from the inner surface of the cylinder. The mill is operated at a speed of approximately 83% of the critical speed.

This mill is charged with about 4,000 pounds of precipitated whiting, together with about 40 pounds of the water white rosin. The mill is driven until the whiting has practically passed through the free flowing stage, and the material is discharged just before it would begin to compact if the grinding were further continued. With the mill and charge described, the grinding period is about 5 to 7 hours. A charge of this amount and particle size would, if ground without the anti-compactant, become so caked after about 2 hours grinding as to prevent any effective grinding thereafter.

In making a material which we have furnished to the rubber industry, the same mill is charged with about 3,600 pounds of precipitated whiting of a particle size averaging about ½ micron diameter together with about 36 pounds of stearic acid. The mill is operated with a cataracting action of the steel balls until there is a drop in the power required to drive the mill, and then the material is discharged after about 1½ to 2½ hours grinding. This point coincides with the transition of the material from the free flowing stage to the compacted stage and the material is preferably discharged while it still retains some of its free flowing characteristics. This charge, because of its smaller particle size and lesser poundage would, if ground without the anti-compactant, be so caked at the end of 10 minutes grinding as to prevent the further effective grinding.

We have also operated continuous mills. For example, we have ground precipitated whiting in accordance with our process in a continuous ball mill 6 feet in diameter and 22 feet long equipped with lifter bars and run at approximately 70% critical speed. The ball load is of ½ inch diameter hardened steel balls filling about 40% of the volume of the mill. The mill is equipped with continuous feed and discharge apparatus. The rate of feed is such that the time of retention of the whiting in the mill is sufficient to subject it to the very prolonged and severe attrition characteristic of our process, which is made possible by the use of our anti-compactant, and the whiting is discharged, preferably at or near the end of the free flowing period.

In each case the anti-compactant prolongs the effective grinding several times (two or more times) beyond that possible if the same charge were to be ground without the use of the anti-compactant.

The following tests show an illustrated example of the relationship between the amount of anti-compactant used and the times of grinding, and in this case also the tensile strength imparted to rubber compositions in which the various whitings were incorporated.

The same basic material, namely, precipitated whiting, was used in each case. The whiting, both unground and ground for various lengths of time, was incorporated in a number of rubber compositions which were molded, cured and tested for tensile strength.

The results are shown in the following table:

*Table 1*

| | Amount stearic acid | Grinding time in hours | | | | | | | | |
|---|---|---|---|---|---|---|---|---|---|---|
| | | 0 | .25 | .5 | 1 | 2 | 3 | 4 | 5 | 6 |
| | | Tensile strengths lbs. per sq. in. | | | | | | | | |
| 1 | None | 3000 | | | | | | | | |
| 2 | None | | 3500 | | | | | | | |
| 3 | .125% | | | 3900 | | | | | | |
| 4 | .25% | | | | | | 4300 | | | |
| 5 | .5% | | | | 3750 | 3950 | 4250 | 4400 | 4400 | |
| 6 | 1.0% | | | | 3900 | 4200 | 4250 | 4425 | 4475 | 4600 |
| 7 | 1.5% | | | | 4000 | 4150 | 4250 | 4400 | 4550 | 4750 |
| 8 | 2% | | | | 4000 | 4175 | 4250 | 4550 | 4625 | 4700 |
| 9 | 3% | | | | 3950 | 4100 | 4200 | 4400 | 4550 | |

In this table the amount of stearic acid used in the nine tests listed is shown at the left of the table. At the top of the table is shown the grinding time in hours. The body of the table gives the tensile strength in pounds per square inch of the cured rubber compositions containing the whitings ground for the various lengths of time specified.

In the first instance, unground whiting was used as indicated by zero grinding time, and the rubber composition had a tensile strength of 3000 pounds. In the second instance, the plain whiting without any stearic acid was ground as long as effective grinding could be continued, or until the whiting was about to become compacted where further effective grinding could not be had. As shown on the table, the effective grinding could not be continued beyond 15 minutes. The tensile strength imparted to the rubber by this whiting was 3500 pounds. In the examples numbered 3 to 9, various amounts of stearic acid were incorporated with the whiting when put into the grinding mill, and the whiting in each instance was ground to substantially the end of the free flowing state or until the whiting was about to pass from the free flowing state into the compacted state. As shown in the third example, the addition of ⅛ of 1% stearic acid prolonged the effective grinding time to ½ hour and the whiting thus ground when incorporated in the rubber gave a tensile strength of 3900 pounds. Grinding beyond the ½ hour would have resulted in the compacting of the whiting. In the fourth instance the use of ¼ of 1% stearic acid prolonged the free flowing period to 3 hours, and the rubber composition had a tensile strength of 4300 pounds. In the fifth instance, the addition of ½ of 1% of the stearic acid prolonged the free flowing period to 5 hours. In this instance, as also in Examples 6 to 9, inclusive, samples of the whiting were taken at the end of each hour grinding and used in making rubber compositions, and the tensile strengths imparted noted in each case upon the table.

As shown by the table, the optimum amount of stearic acid for the precipitated whiting in question was about 1½ to 2%. This prolonged the free flowing period to 6 hours, and, as shown by the table, the tensile strength imparted to the rubber was increased as the grinding was continued up to the limit of attrition made possible by the prolongation of the free flowing period. As shown by the 9th example, increasing the amount of stearic acid to 3% resulted in a decrease in the grinding time permitted, also a decrease in the tensile strength of the rubber.

In each instance, if the grinding were continued beyond the times indicated, the material would have become compacted and coarsened and valueless for filler purposes.

This table is illustrative of the following facts:—The grinding increases the bonding properties of the whiting with the rubber matrix. When grinding was attempted without the use of the stearic acid anti-compactant interbonding agent, the effective grinding time was only 15 minutes, after which the material became compacted and useless. The addition of the stearic acid increased the grinding time many times beyond that which would be had without the stearic acid. There is an optimum amount of stearic acid to be used, and also an optimum grinding time, for the particular material being treated, which, as shown in the table, is about 1½ to 2% stearic acid and about 6 hours grinding time, which was substantially the limit of grinding before the material was about to pass from the free flowing to the compacted stage. An amount of stearic acid above the optimum amount cuts down the effective grinding time and also the bondability of the whiting with the rubber, probably because the stearic acid in excess of the limited amount required to form the molecular films on the particles, tends to cause the mass to agglomerate, and also because excess acid not thus firmly united with the whiting particles as interbonding films probably exerts some deleterious effect upon the rubber composition.

While, as shown by the results of the table, it is preferred to grind the whiting to substantially the end of the free flowing period when it is about to pass from the free flowing to the compacted state, since this appears to be the optimum grinding time and also because the whiting can then be readily discharged from the mill, good results can be secured, as shown by the table, by grinding the whiting for a lesser but substantial portion of the free flowing period. In each instance, however, it will be noted that the markedly increased tensile strengths were not attained until the whiting had been ground with the stearic acid for several times the fifteen minute period which was the limit of attrition without the stearic acid anti-compactant.

The details of the mill and rubber compositions was as follows:—The mill employed for grinding was an 18 inch diameter ball mill filled to 55% of its capacity with ½ inch diameter hardened steel balls and run at 55 revolutions per minute. The charge ground in each case was 36 pounds precipitated whiting. The formula used for the basic rubber stock was as follows:

| | Parts by weight |
|---|---|
| Rubber (smoked sheets) | 93 |
| Zinc oxide | 5 |
| Sulphur | 3.5 |
| Diphenylguanidine | 1 |
| Whiting | 47 |

The same amount of whiting was added to the rubber stock on the rubber mill in each case, and after the stocks were milled, they were molded and cured for 30 minutes at 293° F., which was the optimum cure for each stock. The molded test pieces were then tested for tensile strength at break in the usual way.

While we prefer to use hardened steel balls because of their weight and resistance to abrasion, other grinding elements can be used, such, for example, as porcelain balls, flint pebbles, steel slugs, or steel rods. We prefer to use a mill of the class comprising ball mills, pebble mills and rod mills. Mills of this type consist of a rotating shell containing a large number of loose tumbling grinding elements which have a large aggregate surface area and which are in intimate contact with each other during the grinding, so as to give effective attrition upon powdered materials. In using such mills we have found that for efficient grinding the average diameter of the grinding elements, such as the balls, rods or pebbles, should be under 2 inches, and that they should occupy at least 15% of the volume of the mill, and that the mill should be rotated at not less than about 25% of the critical speed.

In grinding in a ball mill there are four stages of ball condition. The first is the rolling stage, whereby the balls merely roll along in a shell as the cylindrical shell rotates. This is induced by low speed and low ball volume loading. The second stage is that of cascading, where the balls are lifted up to about 10 on the clock scale and cascade over one another back down to the bottom. The transition from the first to the second stage is induced by increasing the speed of rotation of the shell. Upon further increase of the speed of rotation, the cataracting speed is obtained, where the balls are raised just short of position 12 on the clock scale and dropped. The fourth speed is one where the critical speed is exceeded and the balls adhere to the periphery of the mill due to the excess of centrifugal over gravity force. At this speed there is no grinding. Fine materials cannot be satisfactorily ground by the rolling stage action. A cascading action is more desirable than rolling, but we have found that the cataracting action is most desirable in our process, and we therefore prefer to so regulate the speed and ball load that the cataracting effect is obtained. Similar action is obtained in a rod mill and we prefer to operate a rod mill so as to get the cataracting effect of the rods.

We prefer to use precipitated or artificial whiting as the raw material, particularly in preparing our material for paints, for the reasons outlined above. However, other whitings can be used, such, for example, as natural chalk whiting or limestone, particularly for purposes where color and particle size are not so important.

The alkaline earth metal carbonates as a class exhibit grinding properties similar to whiting. When subjected in a powdered condition to continued grinding in a ball mill they tend to compact, but when ground with a small amount of a suitable anti-compactant interbonding agent there is induced the prolonged free flowing state which permits the effective grinding to be continued for a period several times that possible without such agent.

We prefer, in carrying out our process, to thoroughly dry the precipitated whiting before grinding it with the anti-compactant and interbonding agent. These agents are organic materials and if the material is ground wet and then dried there is a tendency for them to become discolored in rapid drying. There is also a tendency to foam in the mill. However, it is possible to grind a wet slurry of precipitated whiting, provided a slurry of the right consistency is employed, neither too thick nor too thin. If the slurry is too thick it cannot be ground, and if it is too thin the particles are too diffused for grinding. The water in the slurry does not have an action like that of an excess of oil in the making of paste, since the water does not act as a lubricant and interfere with the attrition effect of the balls upon the particles and the thorough spreading and pounding of the interbonding agent on the particle surfaces. In grinding in a water slurry, the same precautions must be observed as to the amount of the interbonding agent used. It must not be enough to cause the whiting to form into a cake or paste, or to leave an excess of the interbonding agent in the final product. It must, however, be sufficient to give the bonding effect with the particles.

The specific anti-compactant or interbonding agent employed depends upon the use of the material. In preparing precipitated whiting for use in paints, we prefer to use rosin or calcium resinate, or other resinous materials, and by a resinous material we mean to include not only the resins, but materials which are convertible into resinous substances, such, for example, as the drying oils or drying oil fatty acids. A small amount of linseed oil or linseed oil fatty acids may be employed. In the prolonged grinding of our process, the linseed oil or linseed oil fatty acids are subjected to an oxidizing action which converts them into resinous oxidized products forming films on the particles, probably similar to the calcium resinate films formed by using rosin. Other resinous substances may be used, such as ester gum, phenol aldehyde condensation products, and other natural or synthetic resinous substances. While we prefer to use resinous substances as the interbonding agents for materials to be used in paints since they are in general more compatible with paint oils, other interbonding agents may be employed which will form a firm linkage between the carbonate particles and the paint vehicle, such as the organic acids and salts or soaps thereof, some of the higher alcohols such as stearyl and lauryl, phenols, and in fact any other organic material which is capable of forming such bond as evidenced by actual tests when used to treat the fillers above described according to our process and then tested in paint.

In making a filler for rubber compositions, we prefer to use stearic acid since it is cheap and is also generally recognized in the rubber trade as being a desirable material to have in rubber rather than undesirable material. Stearic acid has an activating effect on certain organic accelerators in the rubber which is desirable. It also has a greater anti-compactant effect than most other organic acids, such, for example, as acetic acid. However, instead of stearic acid other agents may be used. Next to stearic acid we prefer to use calcium stearate, which has an effect very similar to that of stearic acid. However, the organic acids or salts or soaps of organic acids can, in general, be used, as they as a class have an anti-compactant and interbonding action. For example, propionic acid, normal butyric acid, abietic acid or rosin, benzoic acid, phthalic acid or phthalic anhydride, or salts or soaps of such acids, may be employed, as well as some of the higher alcohols, such as stearyl and lauryl, phenols, and in fact, any other organic substance which is capable of forming a strong bond between the filler particles and the rubber as evidenced by actual tests when used to treat the filler above described according to our process and then tested in rubber compositions.

The general formula of an organic acid or salt or soap of such acid, may be expressed as $X-(COO-R)_n$, in which $X$ is an organic radical and $R$ is either hydrogen or a metal. $X$ is preferably a hydrocarbon radical.

The effects of treating the whiting by our process are not discernible by microscopic examination or by other simple laboratory tests, but can be best shown by the action of such treated whiting when incorporated, for example, in rubber, or in paints, which are the two purposes for which the material has so far been commercially developed.

The physical characteristics of precipitated whiting treated in accordance with our invention may be summed up as follows as to their effects on rubber:

1. Rapid dispersion in rubber. It disperses more rapidly than carbon black or untreated whiting, and in fact, more rapidly than any other rubber filler of comparable particle size, such as blanc fixe and zinc oxide. Because of its fast dispersion the rubber may be milled more rapidly and there is less breaking down of the rubber than with less dispersable fillers. Danger from scorching is also minimized.

2. It has a decided reinforcing effect on the rubber, increasing its tensile strength and resistance to wear and tear. It has somewhat the effect of carbon black in this respect, so that the whiting thus treated may be classed as a reinforcing pigment, as contrasted with untreated whiting which has a weakening rather than a reinforcing effect upon rubber.

3. It can be loaded into rubber to a considerably greater extent than untreated whiting or other fillers commonly employed and still give the same tensile strength and other physical properties.

4. It displays no deleterious effects on the aging of the rubber. In the cure it tends to activate certain accelerators, like mercapto-benzo-thiozole. It tends to level differences in cure due to variations in crude rubber and does this better than blanc fixe, carbon black or untreated whiting.

5. It induces good flow or tubing properties in rubber stocks in which it is used.

6. It may be used with colors in rubber because it has little or no tinting value itself in the rubber.

Some of these characteristics in rubber are shown by the following tests.

In the first test six rubber compositions were made up which were identical except for the fillers used. The basic rubber stock was made up as follows:

| | Parts by weight |
|---|---|
| Rubber (smoked sheets) | 93 |
| Zinc oxide | 5 |
| Sulphur | 3.5 |
| Diphenylguanidine | 1 |

This rubber stock was put onto a rubber mill and in each case 20 parts by volume of the filler to 100 parts by volume of rubber were incorporated by milling it into the rubber stock. The fillers thus added were—

1. Untreated precipitated whiting.
2. The same whiting ground with 1% stearic acid by our process.
3. The same whiting ground with 3% benzoic acid by our process.
4. Untreated talc containing some calcium carbonate.
5. The same talc ground with 3.5% zinc stearate by our process.
6. The same talc plus 3.5% zinc stearate added on the rubber mill.

After milling in the fillers the rubber compositions were molded, cured, and tested for tensile strength at break, abrasion loss on the Grasselli abraders, and flexing on a DeMattia machine. Results for optimum cures are shown on the following Table 2.

Table 2

|   | | Tensile at break, lbs. per sq. in. | Abrasion loss in cc per H. P. per hour | Number of flexes before failure |
|---|---|---|---|---|
| 1 | Untreated precipitated whiting | 4080 | 619 | 38,900 |
| 2 | Same as 1 but ground with 1% stearic acid by our process | 4800 | 530 | 56,700 |
| 3 | Same as 1 but ground with 3% benzoic acid by our process | 4980 | 535 | 74,500 |
| 4 | Untreated talc containing some CaCO₃ | 3500 | 620 | 18,200 |
| 5 | Same talc as 4 but ground with 3.5% zinc stearate by our process | 4510 | 427 | 34,400 |
| 6 | Same talc as 4 but plus 3.5% zinc stearate added on rubber mill | 3650 | 570 | 20,600 |

Note that the tensile strength, resistance to abrasion and resistance to failure from flexing is greatly increased by the treatment of both the precipitated whiting and the talc, in accordance with our process, whereas the addition of the same amount of zinc stearate with the talc on the rubber mill had but slight effect upon these properties.

The following table, No. 3, shows the comparative effects of incorporating calcium stearate with precipitated whiting in accordance with our process and in other ways. The same basic rubber stock was employed in each case made up as follows:

Parts by weight
Rubber { smoked sheets _____ 50
       { pale crepe _____ 50
Zinc oxide _____ 5
Sulphur _____ 2.5
Mercapto-benzo-thiazole _____ 1.25

This stock was put on the rubber mill and in each case 100 parts by weight of whiting were added to 100 parts of rubber.

In the first case precipitated whiting was prepared by grinding with 1.2% calcium stearate in accordance with our process. In the second case the same whiting was prepared by grinding in an ordinary type disintegrator with 1.2% calcium stearate. In the third case the same whiting was prepared by incorporating in it 1.2% calcium stearate dissolved in a benzol solution added to the whiting and then evaporated.

The resultant rubber compositions were molded and vulcanized, and then tested for tensile strength and elongation in the usual way. The results for optimum cures are shown on the following table:

Table 3

|   | | Tensile strength lbs. per sq. inch at 500% elongation | Elongation at break |
|---|---|---|---|
| 1 | Precipitated whiting ground with calcium stearate by our process | 3060 | 640 |
| 2 | Precipitated whiting ground with calcium stearate on ordinary type disintegrator | 2500 | 600 |
| 3 | Precipitated whiting to which calcium stearate was added by benzol solution | 2550 | 610 |

Note that the largely increased tensile strength and elongation were not attained except when the calcium stearate was incorporated with the whiting in accordance with our process.

The following table, No. 4, shows the reinforcing effect of precipitated whiting treated in accordance with our process as against a "pure gum" stock and as against the same amount of untreated whiting used in the same formula.

In each case a basic rubber stock was first made up as follows in the usual way by compounding on a rubber mill:

Parts by weight
Rubber { smoked sheets _____ 50
       { pale crepe _____ 50
Zinc oxide _____ 5
Sulphur _____ 2.5
Mercapto-benzo-thiazole _____ 1.25
Stearic acid _____ 1
An anti-oxidant aldehydeamine condensation product sold under the trade name of "Agerite" powder _____ 1

In the first case the test pieces were made up from the pure gum stock only. In the second case there was added to the pure gum stock on the rubber mill 15 parts by weight of precipitated whiting which had been ground with 1% stearic acid in accordance with our process. In the third case 24 parts of such treated whiting were added to the pure gum stock on the rubber mill. In the fourth case 40 parts by weight of such treated whiting were added to the pure gum stock on the rubber mill. In the fifth case 40 parts by weight of the same whiting, untreated, were added to the pure gum stock on the rubber mill. In each case a number of test pieces were molded from each composition, and cured and tested in the usual way. The results for optimum cures are shown on the following table:

Table 4

|   | | Stress in lbs per sq. inch at 500% elongation | Tensile in lbs. per sq. in. at break | Percent elongation at break |
|---|---|---|---|---|
| 1 | Pure gum stock | 410 | 3100 | 785 |
| 2 | Same pure gum stock+15 parts treated whiting | 1075 | 3675 | 730 |
| 3 | Same pure gum stock+24 parts treated whiting | 1470 | 3425 | 682 |
| 4 | Same pure gum stock+40 parts treated whiting | 1510 | 2865 | 645 |
| 5 | Same pure gum stock+40 parts untreated whiting | 1510 | 2100 | 600 |

Note that loadings of 15 parts and 24 parts of the treated whiting gave largely increased tensiles over the pure gum stock. At 40 parts loading with the treated whiting the tensiles at break were still high and much higher than when loaded with the same amount of untreated whiting.

Whitings and the like treated in accordance with our invention have unique properties in paints, which are further evidence of the creation of a much more perfect bond between the paint vehicle and the whiting or the like by the use of our invention. Some of these characteristics are as follows:

1. *Rapid dispersion.*—Materials treated in accordance with our process disperse much more rapidly and completely in paint vehicles than materials not so treated. Thus, some paints may be made without being ground at all, having merely been subjected to a thorough mixing, or if it is preferred to grind such paints, they may be ground at an extremely high rate of production without sacrifice in quality of the paint. This is due to the increased wetability of the surfaces imparted by our process. The dispersion effect of our treated pigments is so great that it may be used in facilitating the grinding of poorly dispersable pigments, such as carbon black, para red and chrome green.

2. *Strength and elasticity of paint films.*—The treated material makes a so much better bond with the paint vehicles that a more cohesive film results, which, in turn, results in greater film strength, elasticity and density (lack of porosity) at equal volume loadings than is the case when untreated materials are used.

3. *Loadability.*—The increased strength and elasticity attained from using the treated material allows of much greater loadings to obtain films of equal strength and elasticity, as compared with any other pigments or fillers.

4. *Durability of paint film.*—The greater strength, elasticity and non-porosity of films containing this treated material results in much greater resistance to failure from exposure to the weather. For instance, the time before chalking sets in is greatly extended by the use of these treated materials, because of the better bond which they make with the vehicle which reflects itself in the vehicle being held up around the pigment particles, so that the pigment particles are not exposed, and in the lower permeability of the film which allows less infiltration of moisture with its effect on the life of the film.

This greater bondability is further reflected in the durability of interior paint films, such as flat wall paints. Flat wall paints containing the treated material will stand much more washing without failure than wall paints containing any other of the usual fillers or pigments.

5. *Effect on film appearance; smoothness, gloss, etc.*—Paints containing the treated material make a much better appearing film under comparable conditions because the increased dispersion results in complete film smoothness.

Gloss is also greatly enhanced and this is particularly true where the non-volatile vehicle percentage is comparatively low. Here again the extra bondability of the treated material is shown to exist in that the vehicle is held up over the pigment particles, protecting them from showing through and interfering with gloss.

The choice of interbonding agent may be regulated to give extreme flow on the one hand, or extreme "shortness" on the other hand. For instance, if rosin be used as the interbonding agent, it induces a state of extreme flow. If stearic acid be used as the interbonding agent, it induces a state of extreme shortness. It cannot be stated that one is, in general, any more desirable than the other, inasmuch as there are applications for both in paint formulating.

6. *Effect on working properties; ease of brushing and spreading.*—At equal pigment loadings in comparable vehicles, our treated materials make thinner paints which are more easily spread and brushed than untreated materials of the same type. Here, again, the choice of interbonding agent has an influence on the property desired. If a state of high flow is present, then the brushing will not be as easy as is the case with a short state. Therefore, the desired balance between flow, on the one hand, and brushing ease, on the other hand, may be regulated by the choice of interbonding agent.

7. *The use of our treated materials in connection with colors in paints has several advantages.*—Certain colors which cannot be made to gloss by themselves when certain loadings are employed, may be made to gloss by the use of our material in connection with them. Treated calcium carbonate, because of its low tinting strength, as well as its glossing properties, is of particular value in this respect.

8. *Non-penetrating and sealing features.*—The treated materials, in the manufacture of which the choice of interbonding agent is such as to promote a high degree of flow, such, for instance, as calcium carbonate treated with rosin, when made into paints with flow-inducing oils or varnishes, impart properties to such paints which result in preventing them from penetrating porous surfaces. Such paints may be applied directly over unsized plaster walls and wall paper without penetrating, with the result that they act as self-priming paints, retaining gloss if they are gloss paints, or their full film strength if they are flat paints.

The same paints may be used as so-called "sealers" for the sealing of "bleeding" surfaces, such as asphalt and dyed finishes. Their function is to prevent the color from the under surface seeping through the new surface and causing discoloration.

Some of these characteristics are shown quantitatively by the following comparative tests.

*Test in 4-hour enamel.*—A 4-hour enamel vehicle was made up as follows:

| | Lbs. |
|---|---|
| Synthetic resin known as "Amberol" resin | 700 |
| Manganese linoleate | 5.25 |
| Lead acetate | 49.00 |
| Cobalt linoleate | 3.50 |
| Raw Chinawood oil | 927.00 |
| Bodied linseed oil | 232.00 |
| Gum turpentine | 290.00 |
| Mineral spirits | 2030.00 |

"Amberol" resin is a synthetic resin containing about 20% phenolaldehyde resin and 80% ester gum. In making up this vehicle the Chinawood oil was heated to 262° C. and held for a string. It was checked with lead acetate and the "Amberol" resin added. The temperature was raised to 275° C. and cooled again by the addition of the linseed oil and manganese and cobalt linoleate. On further cooling to 205° C., the thinners (turpentine and mineral spirits) were added. This is a usual type formula for 4-hour enamel vehicle or varnish.

Six enamels were made with this varnish vehicle, using in each case a weight of vehicle equal to the weight of the individual filler, as follows:

1. Ground limestone.
2. Natural chalk whiting.
3. Precipitated whiting.
4. Precipitated whiting ground by our process with 1% rosin.
5. Precipitated whiting ground with 1% rosin in an ordinary disintegrator.
6. Precipitated whiting treated with 1% rosin dissolved in mineral spirits and then dried.

The pigment to non-volatile vehicle volume ratio calculated on these weights is approximately 1 volume of pigment to 1.3 volumes of the non-volatile paint vehicle.

The fillers were incorporated in the vehicle by the usual grinding method of grinding each pigment with about ½ of the vehicle required to make the finished enamel, in a stone mill. After grinding, they were thinned with the required amount of vehicle to bring them up to the above concentrations. The times required for grinding were observed and are recorded in the following Table No. 5:

Table 5

| | | Grinding time per gallon | Gloss | Film flexibility | Body | Penetration |
|---|---|---|---|---|---|---|
| | | Min. | | | | |
| 1 | Ground limestone | 12 | Poor | 3rd | 20" | Fair. |
| 2 | Natural chalk whiting | 13 | Fair | 2nd | 22" | do. |
| 3 | Precipitated whiting | 20 | Very poor. | 6th | 40" | Bad pen. |
| 4 | Precipitated whiting ground by our process with 1% rosin | 10 | Excellent | 1st | 18" | None. |
| 5 | Precipitated whiting ground with 1% rosin in an ordinary disintegrator | 18 | Poor | 5th | 25" | Pen. |
| 6 | Precipitated whiting treated with 1% rosin dissolved in mineral spirits and then dried. | 15 | ...do... | 4th | 26" | Pen. |

For gloss and flexibility tests the enamels were painted with equal film thicknesses onto standard panels of tin plate. These enamels were allowed to dry for four hours and when dry, were examined for gloss. They were allowed to dry for another 20 hours and then baked at 120° C. for 2 hours. The panels were then bent over a standard mandrel to the same degree of bend in each case and were examined for cracking. The results of these tests are shown in the above Table 5 in which the enamels are rated in the order of their flexibility. The increased flexibility of the paint film containing the whiting ground by our process was quite marked over that of the next best paint film, in that a degree of binding which caused distinct cracking of the next best film, caused no cracking whatever of the paint film containing our material.

The paints were placed in a mobilometer with no weight on the plunger and their body judged by the time it took the plunger to reach the bottom of the mobilometer. These body readings in seconds of time are recorded in the table.

Each of the paints was brushed out on newspaper and observed after 15 minutes for penetration. The results of these observations are also recorded in Table 5. Penetration of the vehicle from the enamel into newspaper is very easily discernible by examining the reverse side of the paper. Penetration is also evidenced when there is loss of gloss of an enamel painted over a porous surface as against the same enamel painted over a non-porous surface.

Note that the grinding time required for the enamel containing the whiting treated in accordance with our process was the lowest, showing its more ready dispersion in the enamel vehicle. It is also to be noted that the same enamel was the only one to give an excellent gloss, and particularly that the enamels made with the same whiting with the rosin incorporated in other manners gave a poor gloss.

It is also to be noted that our treated material gave a film of the greatest flexibility. The enamel made with our treated material had a lower viscosity. This, together with the higher flexibility, demonstrates the greater loadability of our treated whiting. The penetration tests were quite striking, as the enamel made with our material was the only one which did not penetrate so that the penetration was visible at the back of the paper. Neither did it lose any gloss on paper as compared with the same enamel painted on the metal surface.

*Exterior paint exposure tests.*—A number of comparative tests were made in the exposure of exterior paints. The paint vehicle employed was raw linseed oil with a small amount of bodied linseed oil and the usual amounts of driers. Eight paints were made up by incorporating in each case the same volume of the filler or pigment with the oil vehicle as follows:

1. Ground limestone.
2. Natural chalk whiting.
3. Precipitated whiting.
4. The same precipitated whiting ground with 1% rosin by our process.
5. Magnesium silicate.
6. Barytes.
7. Zinc oxide.
8. White lead.

The fillers and pigments were ground in the oil on the usual stone paint grinding mill, and the grinding time observed and recorded in the following Table 6. The several paints were painted out on a wood test fence at an angle of 45° to the south, two coats being applied in each case. They were then allowed to stand exposed to the weather for twelve months, being examined once each month. The results of observations made from such exposure tests are given in the following Table 6.

The same paints were tinted with para red color, each to the same extent, and painted out on other panels of the test fence, and the number of months before the red color had completely faded were observed and recorded in the following Table 6:

Table 6

Exterior paint exposure tests—12 months' test

| | | Grinding time gallon | Months before chalking | Appearance after 12 months | Months before cracking | Fading time in months |
|---|---|---|---|---|---|---|
| | | Min. | | | | |
| 1 | Ground limestone. | 10 | 2 | Poor | No cracking. | 2 |
| 2 | Chalk whiting. | 11 | 4 | ...do... | ...do... | 3 |
| 3 | Precipitated whiting. | 22 | 2 | Very poor. | ...do... | 2 |
| 4 | The same precipitated whiting ground with 1% rosin by our process. | 8 | 12 | Good | ...do... | 8 |
| 5 | Magnesium silicate. | 25 | 1 | Very poor. | ...do... | 1 |
| 6 | Barytes | 6 | 6 | Fair | ...do... | 6 |
| 7 | Zinc oxide | 30 | None at 12 months. | Checked and cracked | 8 | 8 |
| 8 | White lead | 20 | 6 | Good | No cracking. | 6 |

As shown on the tests, our treated whiting had a short grinding time, indicating its ready wetability with the linseed oil vehicle. It withstood chalking better than any of the paints except zinc oxide, which, however, cracked, whereas the paint made with our material showed no cracking at the end of twelve months. Also, the paint made with our material was the only one, except the white lead paint, which presented a good appearance at the end of twelve months. It withstood fading as long as the zinc oxide paint and longer than white lead paint.

These tests show that the whiting treated in accordance with our process can be substituted for the more expensive white leads and zinc oxides in exterior paints insofar as their effect on weathering is concerned, and the paints may be given the necessary covering power by the addition of other poorer weathering pigments, such as lithopone, titanium dioxide, or pigments containing titanium dioxide and a barium or calcium sulphate extender.

The resistance to chalking shows the strong bonding of the oil with the whiting particles treated by our process. A microscopic examination of paints and enamels containing our treated whiting shows that the paint vehicles are strongly held to the surfaces of and surround the whiting particles, completely protecting them against the elements, whereas with most fillers there is so little adhesion between the paint vehicle and the filler particles that the paint vehicle after relatively short weathering no longer adheres to and covers the particles but leaves them exposed, with resultant chalking and color fading.

*Loadability.*—The following table, No. 7, illustrates the greater "loadability" of our treated calcium carbonate over other extenders and pigments in a flat wall paint liquid. These numerical values are obtained by bending, to the same degree of bend in each case, films of equal thickness after they are completely dried. A number of paints were made up for this test containing various percentage loadings of the various pigments and fillers to be tested.

As a result of the bending tests on these paints, certain of the paints were found to possess cracking to an equal degree. These paints are grouped together and their compositions considered in terms of ratio of pigment volume to non-volatile vehicle volume, and the results recorded are expressed in these numerical values for films of equal degrees of flexibility:

Table 7

*Loadability of various fillers and pigments in flat wall paint liquid*

| | | Volume ratio of pigment to non-volatile vehicle |
|---|---|---|
| 1 | Precipitated whiting ground with 1% rosin by our process | 2.80 |
| 2 | Natural chalk whiting | 2.30 |
| 3 | Ground limestone | 2.10 |
| 4 | Magnesium silicate | 1.40 |
| 5 | Lithopone | 1.70 |

The commercial significance of this test lies in the fact that the more heavily loaded the film, all other things being equal, the greater the hiding power of that film. Therefore, when our treated calcium carbonate is used in this connection, higher pigment concentrations may be used and high hiding powers may still be obtained by the substitution of a certain amount of our material for high priced lithopone. An example is as follows:

The following two paints have exactly equal qualities as regards hiding power, film strength and elasticity, brushing ease, and washability:— Paint A costs 53 cents per gallon for raw materials and paint B costs 42 cents per gallon, at present prices:

*Paint A*

| | Percent by volume |
|---|---|
| Ordinary whiting or magnesium silicate | 11.2 |
| Lithopone | 22.4 |
| Volatile vehicle (mineral spirits) | 45.1 |
| Non-volatile vehicle (bodied linseed oil and drier or combination of bodied linseed oil and Chinawood oil) | 21.3 |

*Paint B*

| | Percent by volume |
|---|---|
| Whiting which has been treated with 1% rosin by our process | 30.85 |
| Lithopone | 11.05 |
| Volatile vehicle (mineral spirits) | 42.9 |
| Non-volatile vehicle (same as in A) | 15.2 |

While we have described our invention more particularly with relation to the manufacture of our prebonded precipitated whiting and its use in paints and rubber compositions, materials made in accordance with our process may be employed for other purposes, such, for example, as in the making of other plastics including coating compositions. For example, the treatment of whiting in accordance with our process improves the properties of putty in which it is incorporated, as well as reducing the amount of oil required, thus cheapening the cost of the putty. It may be used advantageously, also, in lacquers, caulking compounds, printing ink, asphalt compositions, and for many other purposes where a relatively low priced material having good bondability with the organic binder may be desired.

It is to be understood, therefore, that the present invention is not limited to the details of the specifically described methods and embodiments, but may be otherwise embodied and practiced within the scope of the following claims.

We claim:

1. The process of preparing whiting for fillers, which comprises grinding the whiting with an organic interbonding agent with such severe and prolonged attrition that the bondability of the whiting with the usual organic matrices employed in paints, rubber, and the like, is greatly increased over that obtainable by grinding the whiting without such agent and over that obtainable by incorporating such interbonding agent with the whiting without such prolonged attrition, the amount of interbonding agent used being not less than about .1% of the whiting but less than that which would form a viscous paste with the whiting in the grinding operation or leave an objectionable uncombined excess in the finished product.

2. The process of preparing alkaline earth metal carbonates for use as fillers, which comprises grinding the carbonate in a finely divided condition for a period several times that possible if the carbonate were ground alone, the grinding being carried out with the addition to the carbonate of an anti-compactant and interbonding agent which serves the dual function of greatly prolonging the effective grinding period and of imparting to the product increased bondability with the usual bonding matrices, the amount of anti-compactant and interbonding agent used being not less than about .1% of the carbonate but less than that which would form a viscous paste with the carbonate in the grinding operation or leave an objectionable uncombined excess in the finished product.

3. The process of preparing alkaline earth metal carbonates for fillers, which comprises grinding the carbonate in a finely divided condition with an interbonding agent with such severe and prolonged attrition that the bondability of the filler with the usual bonding matrices is greatly increased, the amount of interbonding agent used being not less than about .1% of the carbonate but less than that which would form a viscous paste with the carbonate in the grinding operation or leave an objectionable uncombined excess in the finished product.

4. The process of making reinforcing fillers for rubber mixes, which comprises subjecting an alkaline earth metal carbonate to prolonged grinding in a mill having loose tumbling grinding elements with .1 to 5% by weight of a compound having the formula X—(COO—R)$_n$, in which X is an organic radical and R is either hydrogen or a metal, the grinding elements being under 2 inches average diameter and occupying at least 15% of the volume of the mill, the mill being rotated at not less than 25% of critical speed, whereby the vulcanized rubber mix containing such filler has imparted thereto increased tensile strength, resistance to wear and resistance to fatigue, as compared to a similar mix made from the same alkaline earth metal carbonate and with the same amount of said compound, but not having been treated in accordance with the above described grinding conditions.

5. The process of making reinforcing fillers for rubber mixes, which comprises subjecting a whiting to prolonged grinding in a mill of the class composed of ball, pebble and rod mills, with .1 to 5% by weight of a compound having the formula X—(COO—R)$_n$, in which X is an organic radical and R is either hydrogen or a metal, the grinding elements being under 2 inches average diameter and occupying at least 15% of the volume of the mill, the mill being rotated at not less than 25% of critical speed, whereby the vulcanized rubber mix containing such filler has imparted thereto increased tensile strength, resistance to wear and resistance to fatigue, as compared to a similar mix made from the same whiting and with the same amount of said compound, but not having been treated in accordance with the above described grinding conditions.

6. The process of preparing fillers for paints from alkaline earth metal carbonates, which comprises subjecting an alkaline earth metal carbonate to prolonged grinding in a mill having loose tumbling grinding elements with .1 to 5% by weight of a resinous substance which serves as an interbonding agent in markedly increasing the bondability of the carbonate with the usual paint vehicle when such interbonding agent is intimately incorporated on the carbonate particles, the grinding elements being under 2 inches average diameter and occupying at least 15% of the volume of the mill, the mill being rotated at not less than 25% of critical speed, whereby the paints containing such fillers have imparted thereto an increased strength, elasticity and durability of the paint film, as compared to a similar paint composition made from the same alkaline earth metal carbonate and the same amount of said resinous substance, but not having been treated in accordance with the above-described grinding conditions.

7. An improved paint characterized in that it comprises an alkaline earth metal carbonate which has been subjected to severe and prolonged attrition in a mill having loose tumbling grinding elements with .1 to 5% by weight of a resinous substance which serves as an interbonding agent in markedly increasing the bondability of the carbonate with the usual paint vehicles when such interbonding agent is intimately incorporated on the carbonate particles, the grinding elements being under 2 inches average diameter and occupying at least 15% of the volume of the mill, the mill being rotated at not less than 25% critical speed.

8. An improved paint characterized in that it comprises precipitated whiting which has been subjected to severe and prolonged attrition in a mill of the class composed of ball, pebble and rod mills, with .1 to 5% by weight of a resinous substance which serves as an interbonding agent in markedly increasing the bondability of the carbonate with the usual paint vehicles when such interbonding agent is intimately incorporated on the carbonate particles, the grinding elements being under 2 inches average diameter and occupying at least 15% of the volume of the mill, the mill being rotated at not less than 25% critical speed.

9. The process of preparing whiting for fillers, which comprises precipitating whiting in a finely divided condition, drying the precipitated whiting, and subjecting the dry whiting to severe and prolonged attrition with from about .1 to 5% of an organic material containing an acidic radical which combines with calcium to form an organic calcium salt and which serves the dual function of an anti-compactant in causing an evolution of gas in the whiting being ground and inducing a free flowing state prolonged several times beyond that obtainable when the whiting is ground without such anti-compactant and of an interbonding agent in increasing the bondability of the whiting with the usual organic matrices employed in paints, rubber and the like, when such interbonding agent is intimately incorporated on the whiting particles, and continuing the grinding during the greater part of such free flowing state, whereby the anti-compactant interbonding agent is ground into sufficiently intimate contact with whiting particles to markedly increase their bondability with the usual organic matrices over that obtainable by incorporating such interbonding agent with the whiting without such prolonged grinding, and over that obtainable by grinding the whiting to the limit of attrition possible without the anti-compactant interbonding agent.

10. The process of preparing whiting for fillers, which comprises precipitating whiting in a finely divided condition, drying the precipitated whiting, and subjecting the dried whiting in a mill of the class composed of ball, pebble and rod mills, to prolonged attrition with an organic material which serves the dual function of an anti-compactant to cause an evolution of gas in the whiting being ground and inducing a free flowing state prolonged several times beyond that obtainable when the whiting is ground without such an anti-compactant and of an interbonding agent in increasing the bondability of the whiting with the usual organic matrices when such interbonding agent is intimately incorporated on the whiting particles, and continuing the grinding during the greater part of such free flowing state whereby the anti-compactant interbonding agent is thoroughly ground into the whiting and imparts to it increased bonding properties with the usual organic bonding matrices, the anti-compactant interbonding agent being employed in an amount not less than about .1% of the whiting and sufficient to act effectively as an anti-compactant and interbonding agent but insufficient to interfere with the dry free flowing characteristics of the whiting.

11. The process of preparing alkaline earth metal carbonates for fillers, which comprises subjecting the carbonate in a dry, finely divided condition to severe and prolonged attrition with about .1 to 5% of an organic material which serves the dual function of an anti-compactant in causing an evolution of gas in the carbonate being ground and inducing a free flowing state prolonged several times beyond that obtainable when the carbonate is ground without such an anti-compactant and of an interbonding agent in increasing the bondability of the carbonate with the usual organic matrices when such interbonding agent is intimately incorporated on the carbonate particles, and continuing the grinding during the greater part of such free flowing state, whereby the anti-compactant interbonding agent is ground into sufficiently intimate contact with the carbonate particles to markedly increase their bondability with the usual organic matrices employed in paints, rubber and the like over that obtainable by incorporating such interbonding agent with the carbonate without such prolonged grinding and over that obtainable by grinding the carbonate to the limit of attrition possible without the anti-compactant interbonding agent.

12. The process of preparing alkaline earth metal carbonates for fillers, which comprises subjecting the carbonate in a dry, finely divided condition to severe and prolonged attrition with about .1 to 5% of a resinous material which serves the dual function of an anti-compactant in causing an evolution of gas in the carbonate being ground and inducing a free flowing state prolonged several times beyond that obtainable when the carbonate is ground without such an anti-compactant and of an interbonding agent in increasing the bondability of the carbonate with the usual organic matrices employed in paints and the like when such interbonding agent is intimately incorporated on the carbonate particles, and continuing the grinding during the greater part of such free flowing state, whereby the resinous anti-compactant interbonding agent is ground into sufficiently intimate contact with the carbonate particles to markedly increase their bondability with said organic matrices over that obtainable by incorporating such interbonding agent with the carbonate without such prolonged grinding and over that obtainable by grinding the carbonate to the limit of attrition possible without the anti-compactant interbonding agent.

13. The process of preparing alkaline earth metal carbonates for fillers, which comprises subjecting the carbonate in a dry, finely divided condition to severe and prolonged attrition with about .1 to 5% of a compound having the formula X—(COO—R)$_n$, in which X is an organic radical and R is either hydrogen or a metal, and which serves the dual function of an anti-compactant in causing an evolution of gas in the carbonate being ground and inducing a free flowing state prolonged several times beyond that obtainable when the carbonate is ground without such an anti-compactant and of an interbonding agent in increasing the bondability of the carbonate with the usual organic matrices when such interbonding agent is intimately incorporated on the carbonate particles, and continuing the grinding during the greater part of such free flowing state, whereby the anti-compactant interbonding agent is ground into sufficiently intimate contact with the carbonate particles to markedly increase their bondability with organic matrices over that obtainable by incorporating such interbonding agent with the carbonate without such prolonged grinding and over that obtainable by grinding the carbonate to the limit of attrition possible without the anti-compactant interbonding agent.

14. The process of preparing alkaline earth metal carbonates for fillers, which comprises subjecting the carbonate in a finely divided condition with about .1 to 5% of an interbonding agent which when intimately incorporated on the carbonate particles, increases their bondability with the usual organic matrices employed in paints, rubber and the like, to severe attrition prolonged to the point where the carbonate exhibits markedly greater bondability with organic matrices than the same carbonate treated with such agent without such prolonged attrition or the same carbonate subjected to prolonged attrition without the use of the interbonding agent.

15. The process of preparing alkaline earth metal carbonates for fillers, which comprises grinding the carbonate in a mill of the type comprising ball, pebble and rod mills, together with a small amount of an acidic organic material capable of reacting, at least in part, with the alkaline earth metal carbonate, and which serves the dual function of an anti-compactant in causing an evolution of gas in the carbonate being ground and inducing a free flowing state prolonged several times beyond that obtainable when the carbonate is ground without such anti-compactant and of an interbonding agent in increasing the bondability of the carbonate with the usual organic matrices when such interbonding agent is intimately incorporated on the carbonate particles, and continuing the grinding during a substantial part of the free flowing state thus induced so as to grind said agent onto the carbonate particles and thereby impart to them an increased bondability with organic matrices, the amount of the acidic organic material used being not less than about .1% of the carbonate but less than that which would interfere with the dry free-flowing characteristics of the carbonate.

16. The process of preparing whiting for fillers, which comprises grinding the whiting with about .1 to 5% of an organic material which serves as an interbonding agent in increasing the bondability of the whiting with the usual organic matrices employed in paints, rubber and the like, when such interbonding agent is intimately incorporated on the whiting particles, with such severe and prolonged attrition that the bondability of the whiting with said usual organic matrices, is greatly increased over that obtainable by grinding the whiting without such agent and over that obtainable by incorporating the interbonding agent with the whiting without such prolonged attrition.

17. A filler for plastics, consisting of a modified alkaline earth metal carbonate produced by grinding an alkaline earth metal carbonate in a finely divided condition for a period several times that possible if the carbonate were ground alone, the grinding being carried out with the addition to the carbonate of a small amount of an organic anti-compactant and interbonding agent which serves the dual function of greatly prolonging the effective grinding period and of imparting to the carbonate increased bondability with the usual bonding matrices, said carbonate filler being characterized by a much more rapid dispersion in the usual bonding matrices than the same carbonate not so treated and by a much higher bondability than the same carbonate not so treated, the amount of the anti-compactant interbonding agent used being not less than about .1% of the carbonate but insufficient to interfere with the dry free-flowing characteristics of the modified carbonate.

18. A filler for plastics, consisting of a modified alkaline earth metal carbonate produced by subjecting an alkaline earth metal carbonate in dry finely divided condition to severe and prolonged attrition with about .1 to 5% of an organic material which serves the dual function of an anti-compactant in causing an evolution of gas in the carbonate being ground and inducing a free flowing state prolonged several times beyond that obtainable when the carbonate is ground without such an anti-compactant and of an interbonding agent in increasing the bondability of the carbonate with the usual organic matrices when such interbonding agent is intimately incorporated on the carbonate particles, and continuing the grinding during the greater part of such free flowing state, said carbonate being characterized by a bondability with the usual organic matrices greater than that obtainable by incorporating the interbonding agent with the carbonate without such prolonged grinding and greater than that obtainable by grinding the carbonate to the limit of attrition possible without the anti-compactant interbonding agent.

19. A paint containing a vehicle and a modified alkaline earth metal carbonate, the modified alkaline earth metal carbonate being produced by grinding an alkaline earth metal carbonate in a finely divided condition for a period several times that possible if the carbonate were ground alone, the grinding being carried out with the addition to the carbonate of an organic anti-compactant and interbonding agent which serves the dual function of greatly prolonging the effective grinding period and of imparting to the carbonate increased bondability with the vehicle, said modified alkaline earth metal carbonate being characterized by a much more rapid dispersion in the vehicle and by a much higher bondability with the vehicle than the same carbonate not so treated, the amount of the anti-compactant interbonding agent used being not less than about .1% of the carbonate but insufficient to interfere with the dry free flowing characteristics of the modified carbonate.

20. A paint containing a four-hour varnish and a modified alkaline earth metal carbonate, the modified alkaline earth metal carbonate being produced by grinding an alkaline earth metal carbonate in a finely divided condition for a period several times that possible if the carbonate were ground alone, the grinding being carried out with the addition to the carbonate of an organic anti-compactant and interbonding agent which serves the dual function of greatly prolonging the effective grinding period and of imparting to the carbonate increased bondability with the varnish, said modified alkaline earth metal carbonate being characterized by a much more rapid dispersion in the varnish and by a much higher bondability with the varnish than the same carbonate not so treated, the amount of the anti-compactant interbonding agent used being not less than about .1% of the carbonate but insufficient to interfere with the dry free flowing characteristics of the modified carbonate.

21. A paint containing a vehicle and a modified alkaline earth metal carbonate, the modified alkaline earth metal carbonate being produced by subjecting an alkaline earth metal carbonate in dry finely divided condition to severe and prolonged attrition with about .1 to 5% of a resinous material which serves the dual function of an anti-compactant in causing an evolution of gas in the carbonate being ground and inducing a free flowing state prolonged several times beyond that obtainable when the carbonate is ground without such an anti-compactant and of an interbonding agent in increasing the bondability of the carbonate with the vehicle when such resinous material is intimately incorporated on the carbonate particles, and continuing the grinding during the greater part of such free flowing state, said modified carbonate being characterized by a bondability with the vehicle greater than that obtainable by incorporating the resinous material with the carbonate without such prolonged grinding and greater than that obtainable by grinding the carbonate to the limit of attrition possible without the resinous material.

JOHN W. CHURCH.
RAYMOND R. McCLURE.